J. K. Lowe.

Inking Appa's for Printing Press.

No. 3896 Reissued Mar. 22. 1870.

Witnesses

E. E. Waite
Frank Alden.

Inventor

John K. Lowe.

United States Patent Office.

VALENTINE WOOD, OF RICHMOND, INDIANA, AND J. E. SUITTERLIN, OF CHICAGO ILLINOIS, FOR THEMSELVES AND VALENTINE WOOD, ADMINISTRATOR OF THE ESTATE OF GEORGE W. WOOD, DECEASED, ALL ASSIGNEES OF JOHN K. LOWE.

*Letters Patent No.* 63,540, *dated April* 2, 1867; *reissue No.* 3,896, *dated March* 22, 1870.

IMPROVEMENT IN INKING-APPARATUS FOR PRINTING-PRESSES.

The Schedule referred to in these Letters Patent and making part of the same

*To all whom it may concern:*

Be it known that JOHN K. LOWE, of Cleveland, in the county of Cuyahoga and State of Ohio, did invent certain Improvements in Inking-Apparatus for printing in more than one color at one impression; and we do hereby declare that the following is a full, clear, and exact description of the same, reference being had to the annexed drawings making part of this specification, in which—

The same letters are employed in all the figures in the designation of the same parts.

Figure 1:
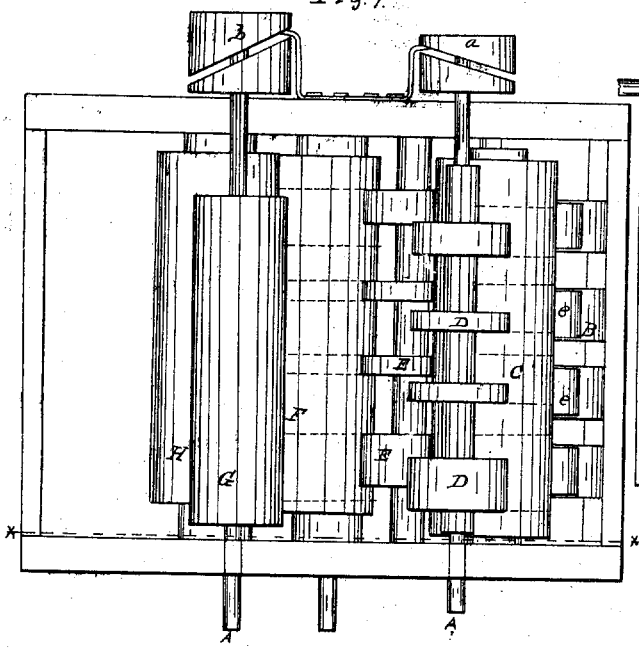
Figure 1 is a plan view.
Figure 2:
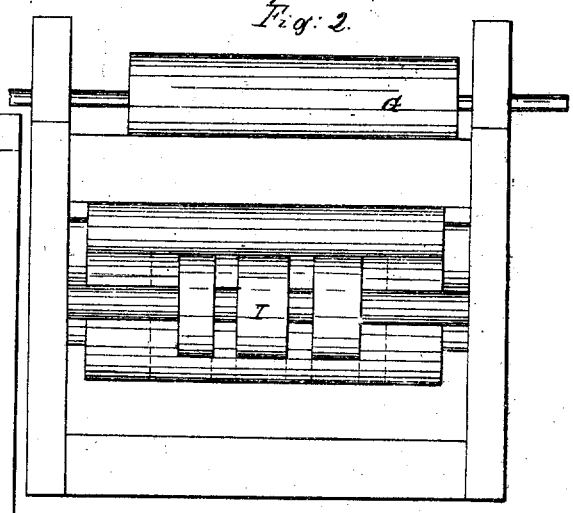
Figure 2 is an end elevation.
Figure 3:
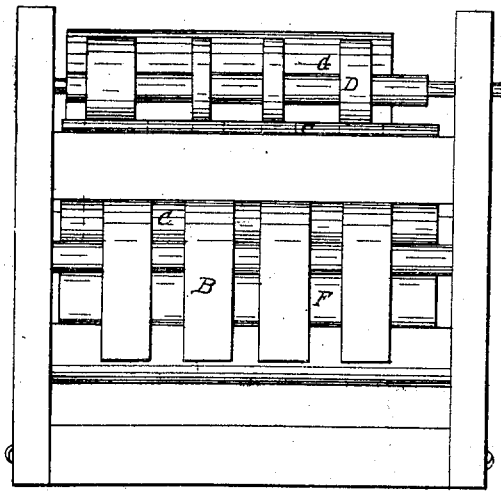
Figure 3 is an elevation, showing the opposite end.
Figure 4:
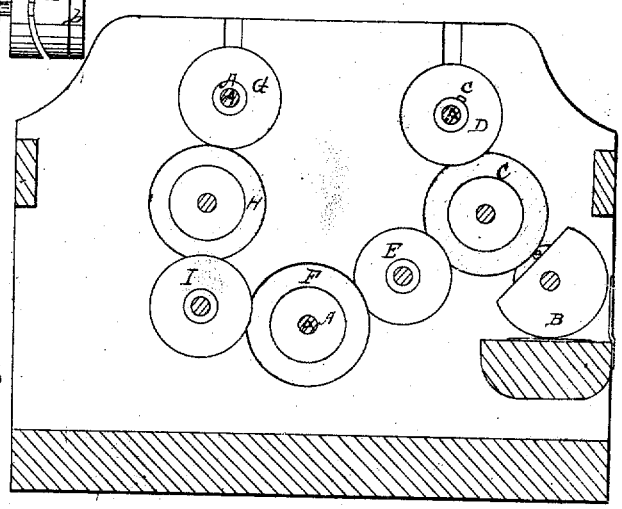
Figure 4 is a vertical section on the line *x x* of fig. 1.

This invention relates to an improved inking-apparatus for printing in more than one color at a single impression; and The improvement consists in disposing the colors in bands upon a type-inking roller, from which they are simultaneously transferred to the form of type, such colors being first deposited upon the said type-inking roller by independent sets of transferring and distributing-apparatus in parallel bands, the process of distribution having been completed before the ink is transferred to the type-inking roller.

To enable those skilled in the art to make and use this invention, we will proceed to describe its construction and operation.

In the annexed drawings—

A A are shafts of the rollers, to which pulleys are attached, by which the apparatus is operated.

The inking-fountains B B, of ordinary construction, are intended to contain the colors for the ink, which is taken up from the fountains, and tranfersed by the rollers *e* to the distributing-roller C, upon the surface of which it will be deposited in bands.

In order to effect an equal distribution of the ink, it is necessary that it should be rubbed upon the surface of the distributing-roller. This is effected by a device in common use, namely, a roller, D, having upon the outer end of its shaft a cam, *a*, on which is cut a diagonal groove, which, receiving the point of a fixed rod, will give to the said roller D a longitudinal reciprocating motion in the direction of its axis at the same time that it has a rotary motion on its axis. To permit this longitudinal motion, it is necessary that the bearings of the journals should be lengthened, so as to permit their free play through the boxes.

As more than one colored ink may be used, it is necessary to provide that the bands of colors upon the distributing-roller C shall not be amalgamated, which would result if a continuous roller were used for effecting the distribution. To avoid this, the roller D is formed of sections, as shown in the drawings, which may be of different widths, according to the breadth of the different colors in the design, and which are, therefore, adjustably attached to the shaft, so that they may be arranged at will.

As the rollers D revolve on the surface of the distributing-roller, and also have, as described, a motion in the direction of the length of their axes, it follows that a complete distribution may be effected of the bands of colors. The inks thus distributed are then taken up on a series of sectional rollers, E, adjustably attached to a shaft having no longitudinal play. The width and position of these sections will be determined by the design intended to be applied to the form of type.

The surface of these sectional rollers revolves in contact with the bands of ink upon the distributing-roller C, and is also in contact with the surface of the type-inking or communicating roller F, so that the bands of colors, duly distributed, will thus be arranged in proper order upon the communicating or type-inking roller.

In printing with small type, or where, according to the design, different colors are to be brought in close proximity to one another, it is apparent that a proper distribution could not be effected by one distributing-roller, because in such case the longitudinal movement of the roller D would inevitably amalgamate the inks on the surface of the roller C. To avoid this difficulty, I employ another set of fountains and distributing and transferring-rollers, intended to operate with a single color, to be arranged in bands upon the roller F, between the bands received from the rollers E.

The general arrangement of the rollers G H I, and the mode of effecting distribution, is the same as that already explained for the rollers D C E. As, however, this part of the apparatus is designed to only communicate one color, the roller G is continuous, and not divided into sections as the roller D.

The roller I is sectional like the roller E, the width and position of the sections being determined by the spaces between the bands carried upon the roller F from the sections E.

All colors intended to be used having thus been brought upon the roller F after being sufficiently distributed, and there disposed in bands corresponding with the colors intended by the design to be given to the completed job, they may now be simultaneously transferred to the form of type in the same manner as in other inking-apparatus where but a single color is used.

This invention is distinguished from all other modes of printing in colors in this, that the distribution is first effected upon separate sets of apparatus, so as to avoid amalgamation of the colors, and the colors thus distributed are then carried and deposited, by rollers having no longitudinal motion, in bands upon a roller, F, also having no longitudinal motion, from which such inks may be simultaneously transferred to the form of type, so that the job may be completed in more than one color at one impression.

What is claimed as the invention of the said JOHN K. LOWE, and desired to be secured by Letters Patent, is—

1. The combination of the roller F with distinct sets of ink-transferring surfaces revolving upon different shafts, and conveying the different colors, after distribution has been independently effected, in bands, to the common roller F, substantially as set forth.

2. The combination of the group of rollers D C E and the group of rollers G H I with the roller F, as and for the purpose specified.

VALENTINE WOOD.
J. E. SUITTERLIN.
VALENTINE WOOD.
*Administrator of George W. Wood's Estate.*

Witnesses for V. WOOD and J. E. SUITTERLIN:
LEVI S. CURRIER,
HARRISON OGBORN.
Witnesses for V. WOOD,
(*Administrator of G. W. Wood's Estate:*)
AUGUSTUS B. YOUNG,
WILLIAM M. THOMPSON.